United States Patent [19]

Izawa et al.

[11] Patent Number: 5,715,010

[45] Date of Patent: Feb. 3, 1998

[54] VIDEO SIGNAL COMPRESSION APPARATUS FOR HORIZONTAL COMPRESSION OF A VIDEO SIGNAL

[75] Inventors: Yosuke Izawa, Ibaraki; Masahiro Tani, Daito; Naoji Okumura, Minou; Yutaka Nio, Osaka; Toshichika Sato, Takatsuki, all of Japan

[73] Assignee: Matsushita Electric Industrial Co., Ltd., Osaka, Japan

[21] Appl. No.: 725,075

[22] Filed: Oct. 2, 1996

Related U.S. Application Data

[62] Division of Ser. No. 361,634, Dec. 22, 1994.

[30] Foreign Application Priority Data

Dec. 22, 1993 [JP] Japan .................... 5-324912
Jun. 20, 1994 [JP] Japan .................... 6-137075

[51] Int. Cl.$^6$ .................................... H04H 7/01
[52] U.S. Cl. ........................... 348/445; 348/913
[58] Field of Search ........................ 348/445, 448, 348/458, 441, 555, 556, 561, 581, 582, 568, 913; H04H 7/01

[56] References Cited

U.S. PATENT DOCUMENTS

| | | |
|---|---|---|
| 3,909,839 | 9/1975 | Inaba et al. . |
| 4,672,443 | 6/1987 | Dischert et al. . |
| 4,774,581 | 9/1988 | Shiratsuchi . |
| 4,845,562 | 7/1989 | Koslov et al. . |
| 4,914,507 | 4/1990 | Smith et al. ............ 348/445 |
| 4,951,125 | 8/1990 | Kojima et al. . |
| 4,963,964 | 10/1990 | Mayweather, III et al. . |
| 4,991,022 | 2/1991 | Canfield et al. . |
| 5,125,043 | 6/1992 | Karlsson . |
| 5,136,398 | 8/1992 | Rodriguez-Cavazos et al. . |
| 5,229,853 | 7/1993 | Myers . |
| 5,231,490 | 7/1993 | Park ........................ 348/445 |
| 5,243,421 | 9/1993 | Nagata et al. . |
| 5,276,515 | 1/1994 | Katsumata et al. . |
| 5,323,235 | 6/1994 | Tonomura et al. . |
| 5,343,238 | 8/1994 | Takata et al. . |
| 5,343,299 | 8/1994 | Ishikawa ................. 348/445 |
| 5,442,406 | 8/1995 | Altmanshofer et al. . |
| 5,534,934 | 7/1996 | Katsumata et al. ........ 348/556 |

FOREIGN PATENT DOCUMENTS 0 287 174  10/1988  European Pat. Off. .

OTHER PUBLICATIONS

M. Isnardi et al., "Decoding Issues in the ACTV System", *IEEE Transactions on Consumer Electronics*, pp. 111–120, vol. 34 (Feb. 1988).

European Search Report dated Jun. 14, 1996.

*Primary Examiner*—Michael H. Lee
*Attorney, Agent, or Firm*—Ratner & Prestia

[57] ABSTRACT

A video signal compression apparatus extracts a specific value written in a read only memory at every system clock pulse. The specific value can be varied at every clock pulse. Therefore, for example, only the center part of a picture can be horizontally compressed. A FIFO memory may be used. It is possible to select a mode with a fixed compression ratio or a mode in which a compression ratio varies at every clock pulse. Further, the fixed compression ratio can be set from the outside. Display position of the picture can also be changed.

1 Claim, 14 Drawing Sheets

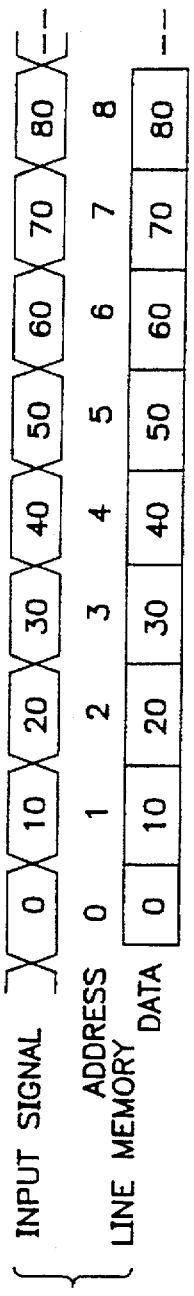
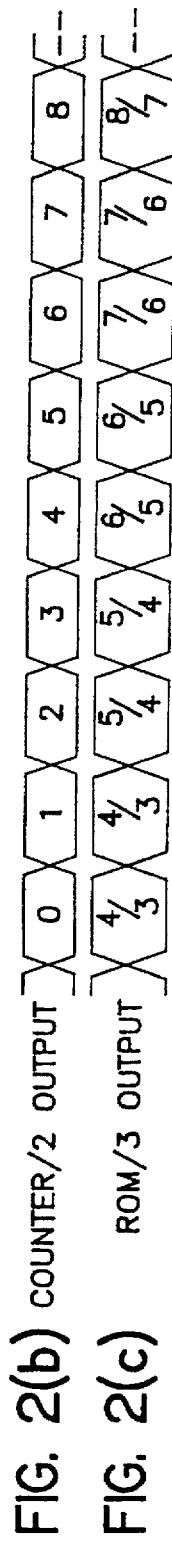
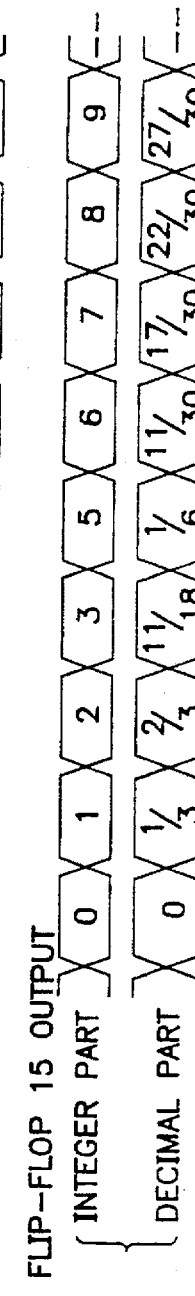
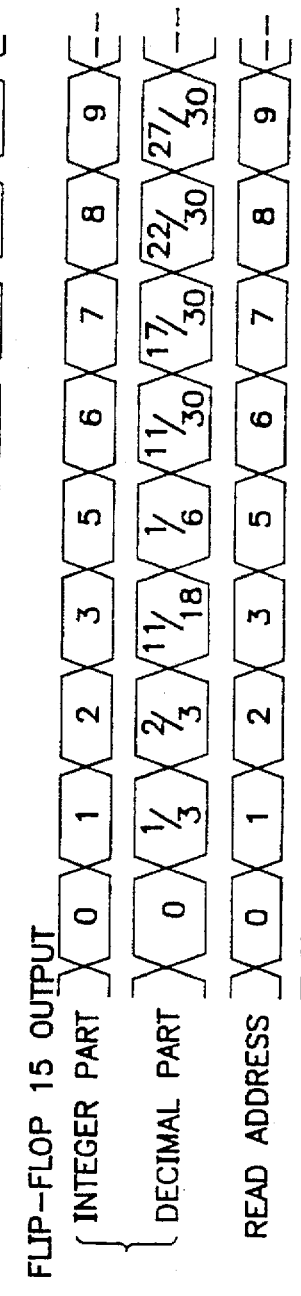
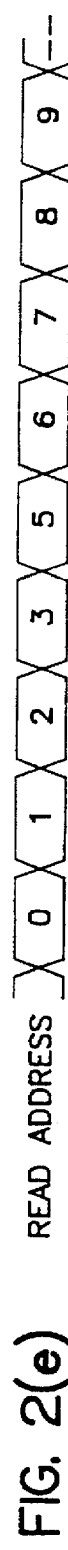
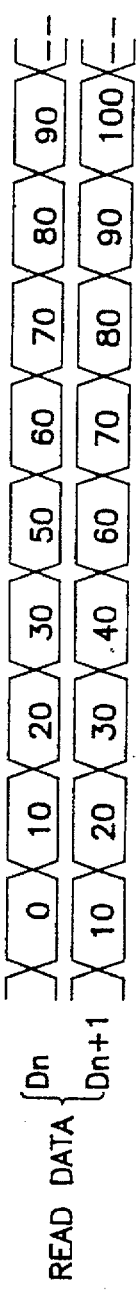
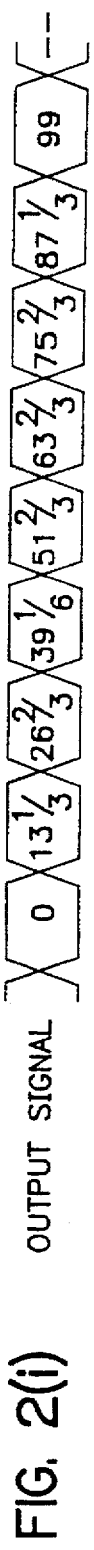

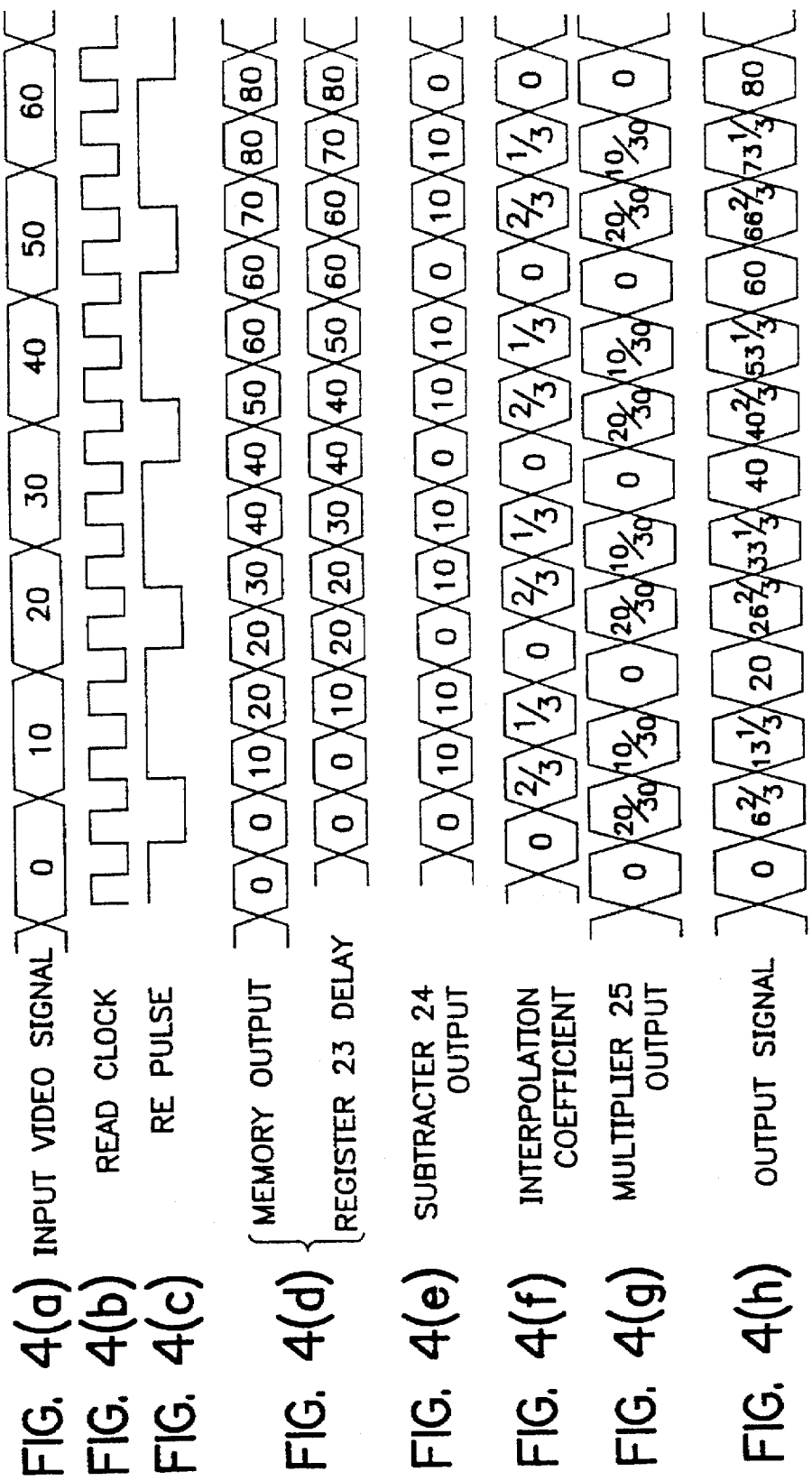

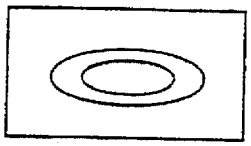
FIG. 6(a)
SIGNAL SELECTING MEANS 106: B
COMPRESSION RATIO: 1 (FIXED)
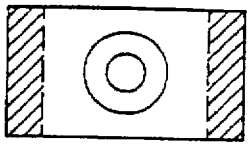
FIG. 6(b)
SIGNAL SELECTING MEANS 106: B
COMPRESSION RATIO: 3/4 (FIXED)
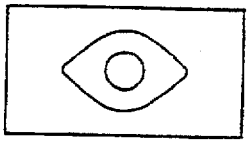
FIG. 6(C)
SIGNAL SELECTING MEANS 106: B
COMPRESSION RATIO: NOT FIXED
FIG. 6(D)
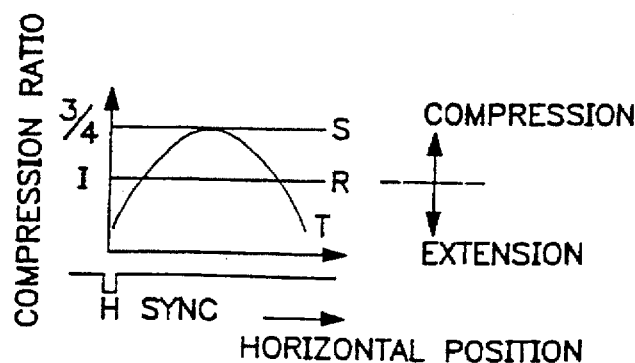

FIG. 10(c) PRIOR ART  READ ADDRESS An
FIG. 10(d) PRIOR ART  READ DATA { Dn, Dn+1 }
FIG. 10(e) PRIOR ART  SUBTRACTER 37 OUTPUT
FIG. 10(f) PRIOR ART  MULTIPLIER 38 OUTPUT
FIG. 10(g) PRIOR ART  OUTPUT SIGNAL
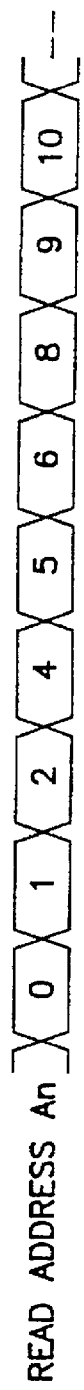
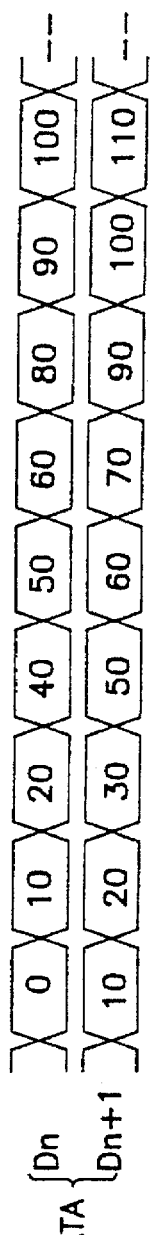
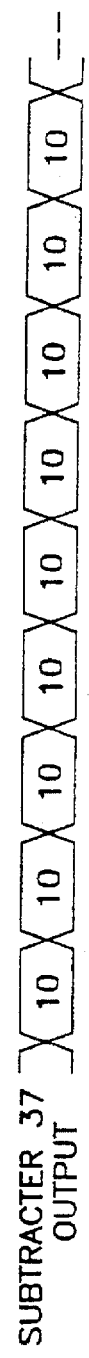
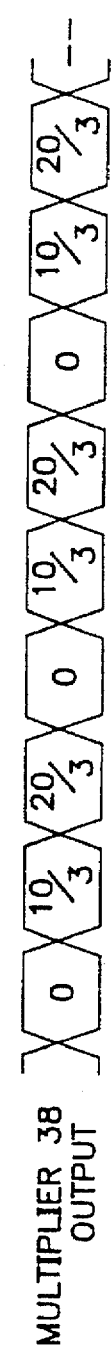

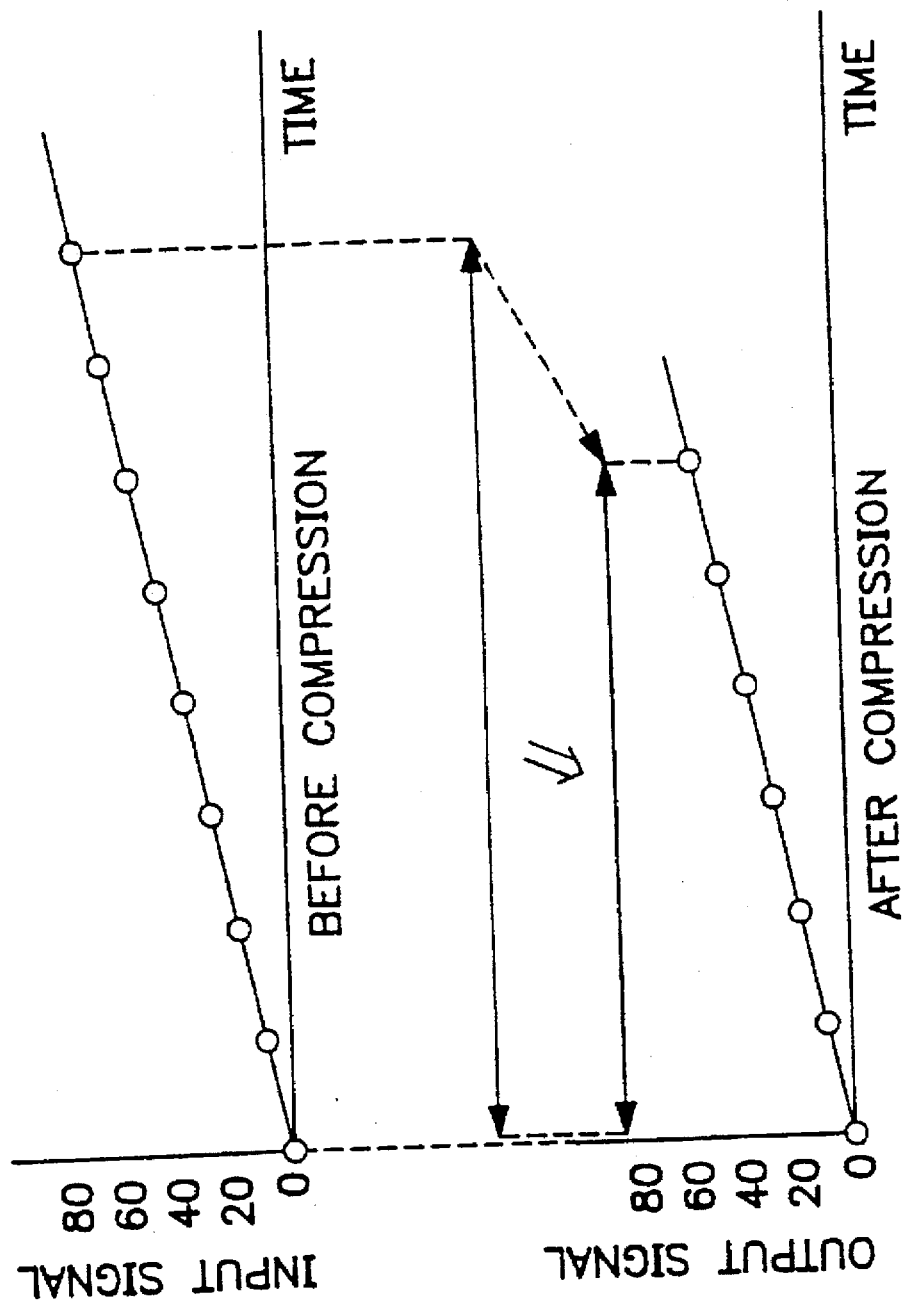

BEFORE COMPRESSION

AFTER COMPRESSION

VIDEO SIGNAL COMPRESSION APPARATUS FOR HORIZONTAL COMPRESSION OF A VIDEO SIGNAL

This application is a division of application Ser. No. 08/361,634, filed Dec. 22, 1994, (status allowed).

FIELD OF THE INVENTION

The present invention relates to a video signal compression apparatus for horizontally compressing a video signal for television receivers, video cassette recorders, video projectors, etc.

BACKGROUND OF THE INVENTION

Recently, wide screen displays having an aspect ratio of 16:9 (shown, for example, in FIG. 12(a)) are spreading in the Japanese market. When an ordinary video signal having an aspect ratio of 4:3 (that is 12:9) is applied to a display apparatus having an aspect ratio of 16:9, the displayed picture is horizontally deformed (elongated). As a result, a true circle, for example, is displayed as an ellipse (as shown in FIG. 12(a)). Accordingly, in order to get a correct picture, it is desirable to compress a video signal horizontally as shown in FIG. 12(b). In FIG. 12(b), the picture aspect ratio is 4:3, while the screen aspect ratio is 16:9.

A block diagram of a video signal compression apparatus in accordance with a first exemplary embodiment of the present invention is shown in FIG. 9. A line memory 31 using an SRAM (static random access memory) stores an input video signal in order from the address 0 and when a read address $A_n$ is given, outputs data $D_n$ and $D_{n+1}$ for the address $A_n$ and $A_{n+1}$, respectively. An address generator 32 includes a counter 34, a multiplier 35 and an adder 36. The counter 34 counts the number of clock pulses and outputs 0, 1, 2, 3, . . . , after being cleared, synchronizing with a horizontal sync signal 103. The multiplier 35 multiplies the output of the counter 34 by a specific value given from the outside. This specific value determines a compression ratio. The adder 36 adds an integer part of the output of the multiplier 35 and the output of the counter 34 and makes a read address $A_n$ of the line memory 31.

An interpolation filter 33 includes a subtracter 37, a multiplier 38 and an adder 39. The subtracter 37 calculates data $(D_{n+1}-D_n)$. The multiplier 38 multiplies $(D_{n+1}-D_n)$ by a decimal part of the output of the multiplier 35. The adder 39 adds the data $D_n$ and the output of the multiplier 38 and outputs the sum. The output of the adder 38 is a compressed video signal as explained below.

The performance of a video signal compression apparatus in accordance with the prior art is explained using a time chart shown in FIG. 10.

(a) The data of the input video signal is stored in the line memory 31 in order from address 0.

(b) The multiplier 35 calculates the products of the output 0, 1, 2, 3, . . . , of the counter 34 and a specific value (⅓ in this case). The calculated result is separated to an integer part and a decimal part.

(c) The read address $A_n$ is made from the sum of the integer part and the output of the counter 34.

(d) When the read address $A_n$ is inputted, the line memory 31 outputs the data $D_n$ and $D_{n+1}$.

(e) The subtracter 37 calculates data $(D_{n+1}-D_n)$.

(f) The multiplier 38 multiplies the data $(D_{n+1}-D_n)$ by the decimal part separated from the output of the multiplier 35.

(g) The adder 39 adds the data $D_n$ and the output of the multiplier 38 and outputs a compressed video signal.

FIG. 11(a) shows a video signal before compression, that is an input video signal and FIG. 11(b) shows a video signal after compression, that is an output signal of the video signal compression apparatus. The axis of abscissa shows time and the axis of ordinate shows signal level.

SUMMARY OF THE INVENTION

A video signal compression apparatus in accordance with a first exemplary embodiment of the present invention takes out and uses a specific value written in a ROM (read only memory) at every system clock signal. The specific value can be varied at every system clock. Therefore, for example, only the center part of the image can be horizontally compressed.

A video signal compression apparatus in accordance with a second exemplary embodiment of the present invention uses a FIFO (first in, first out) memory which does not need to generate addresses. Therefore, the circuit scale can be made small.

A video signal compression apparatus in accordance with a third exemplary embodiment of the present invention can select a mode with a constant compression value or a mode to vary a compressed value at every system clock pulse. Further, the constant compression value can be set from the outside.

A video signal compression apparatus in accordance with a fourth exemplary embodiment of the present invention can vary a display position of the picture.

BRIEF DESCRIPTION OF THE DRAWINGS

FIGS. 2(a)–(i) shows timing charts of a video signal compression apparatus in accordance with the first exemplary embodiment of the present invention.

FIGS. 4(a)–(j) shows a timing chart of a video signal compression apparatus in accordance with the second exemplary embodiment of the present invention.

FIGS. 6(a)–(d) illustrates displayed pictures for three different compression ratios of a video signal compression apparatus in accordance with the third exemplary embodiment of the present invention.

FIGS. 10(a)–(g) shows a timing chart of a video signal compression apparatus in accordance with the prior art.

FIGS. 11(a)–(b) shows how a video signal is compressed.

DETAILED DESCRIPTION OF THE INVENTION (First Exemplary Embodiment)

Figure 1:
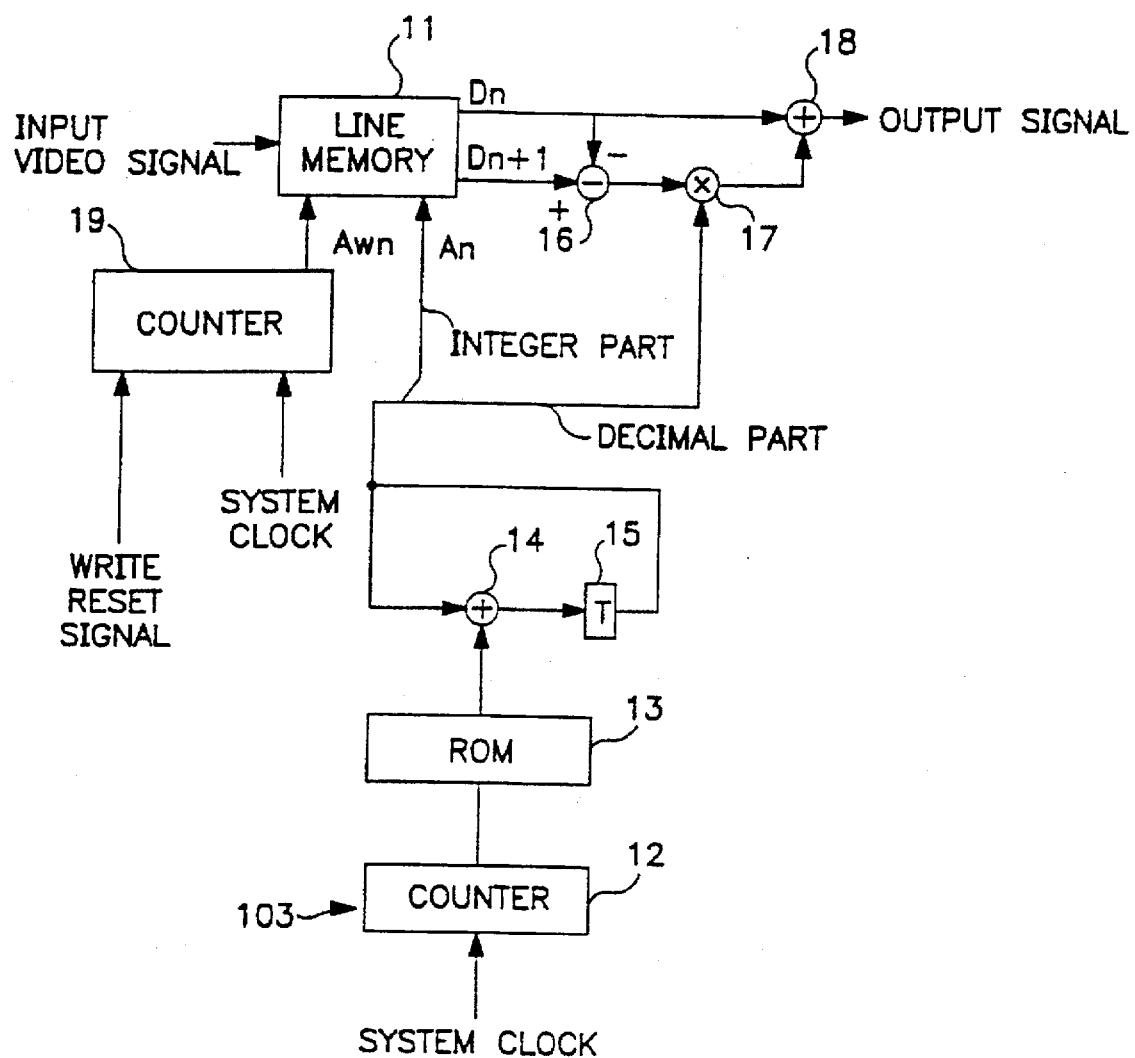
FIG. 1 is a block diagram of a video signal compression apparatus in accordance with a first exemplary embodiment of the present invention.

A block diagram of a video signal compression apparatus in accordance with a first exemplary embodiment of the present invention is shown in FIG. 1. A counter 19 counts responsive to system clock pulses and generates a write address Awn. The counter 19 counts in order beginning, for example, from 0 after being cleared by a write reset signal which is synchronized to the each horizontal synchronous signal of an input video signal. Line memory 11 stores the input video signal (which may be, for example, an analog or a digital signal) in order in the write address Awn and when a read address An is given, the line memory 11 outputs data Dn for the address An and data Dn+1 for the address An+1. A counter 12 counts the number of system clock pulses after being cleared by a read reset signal 103 and outputs counted data 0, 1, 2, 3, . . . The read address An is generated based on the counted data of the counter 12. A phase difference between the read reset signal and the write reset signal is arbitrated so that the read address An is not provided preceding the data store in the write address Awn.

A ROM 13 outputs a specific value which is previously written, individually corresponding to each counted data of the counter 12.

An adder 14 adds an output of a register 15 and an output of the ROM 13. An integer part in the output of the register 15 is used for a read address of the line memory 11. A subtracter 16 calculates $(D_{n+1}-D_n)$. A multiplier 17 multiplies the data $(D_{n+1}-D_n)$ by the decimal part of the output of the register 15. An adder 18 adds the data $D_n$ and the output of the multiplier 17 and outputs the sum. The output of the adder 18 is a compressed video signal as explained below.

The performance of a video signal compression apparatus in accordance with the first exemplary embodiment of the present invention is explained using a timing chart shown in FIGS. 2(a)–(i).

As shown in FIG. 2(a), the data of the input signal is stored in the line memory 11 in order from the address 0.

As shown in FIG. 2(b), the counter 12 outputs the counted data 0, 1, 2, 3.

As shown in FIG. 2(c), the ROM 13 outputs the specific value previously written, individually corresponding to each counted data of the counter 12.

As shown in FIG. 2(d), the output of the register 15 is an integral value of the specific value outputted from the ROM 13 and is separated to an integer part and a decimal part.

As shown in FIG. 2(e), the integer part of the output of the register 15 is used for the read address $A_n$.

As shown in FIG. 2(f), by inputting the read address $A_n$, the line memory 11 outputs the data $D_n$ and $D_{n+1}$.

As shown in FIG. 2(g), the subtracter 16 calculates the data $(D_{n+1}-D_n)$.

As shown in FIG. 2(h), the multiplier 17 multiplies the data $(D_{n+1}-D_n)$ which is an output of the subtracter 16 by the decimal part separated from the output of the register 15.

As shown in FIG. 2(i), the adder 18 adds the data $D_n$ and the output of the multiplier 17 and outputs a compressed video signal.

According to the first exemplary embodiment of the present invention, the compression ratio can be varied at every system clock signal. For example, it is possible to compress only the center part of the picture.

(Second Exemplary Embodiment)

Figure 3:
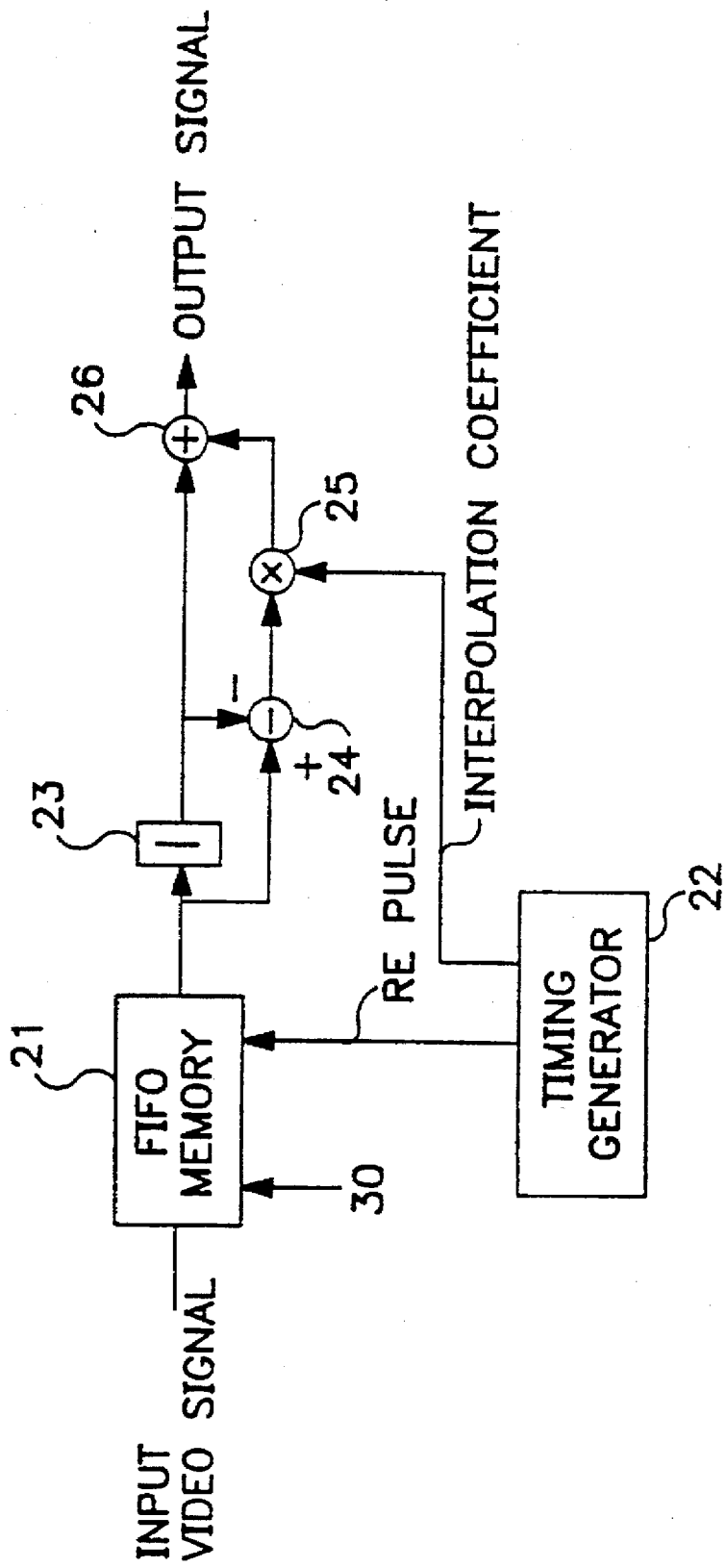
FIG. 3 is a block diagram of a video signal compression apparatus in accordance with a second exemplary embodiment of the present invention.

A block diagram of a video signal compression apparatus in accordance with a second exemplary embodiment of the present invention is shown in FIG. 3.

A FIFO memory 21 stores an input video signal in order. A timing generator 22 generates a RE (read enable) pulse to control the FIFO memory 21 and an interpolation coefficient for interpolation. A register 23 delays the output of the FIFO memory 21. A subtracter 24 subtracts an output of the register 23 from the output of the FIFO memory 21. A multiplier 25 multiplies the output of the subtracter 24 by the interpolation coefficient generated at the timing generator 22. An adder 26 adds the output of the register 23 and the output of the multiplier 25 and outputs the sum. The output of the adder 26 is a compressed video signal as explained below.

The performance of a video signal compression apparatus in accordance with the first exemplary embodiment of the present invention is explained using a timing chart shown in FIGS. 4(a)–(j).

As shown in FIG. 4(a), data of an input video signal is stored in the FIFO memory 21 in order.

As shown in FIGS. 4(b) and (c), a read clock signal 30 and a RE pulse are inputted to the FIFO memory 21. A system clock signal having two times of the write clock frequency is used for a read clock signal.

Because only the clock signal which is coincident with the RE pulse is effective, the data is read out repeating a cycle of two time read and one time rest.

As shown in FIG. 4(d), the data read out is delayed at the register 23.

As shown in FIG. 4(e), the subtracter 24 subtracts the output of the register 23 from the data read out.

As shown in FIGS. 4(f) and (g), the multiplier 25 multiplies the output of the subtracter 24 by an interpolation coefficient generated at the timing generator 22.

As shown in FIG. 4(h), the adder 26 adds the output of the register 23 and the output of the multiplier 25 and outputs a compressed video signal.

Figures 4I, 4J:
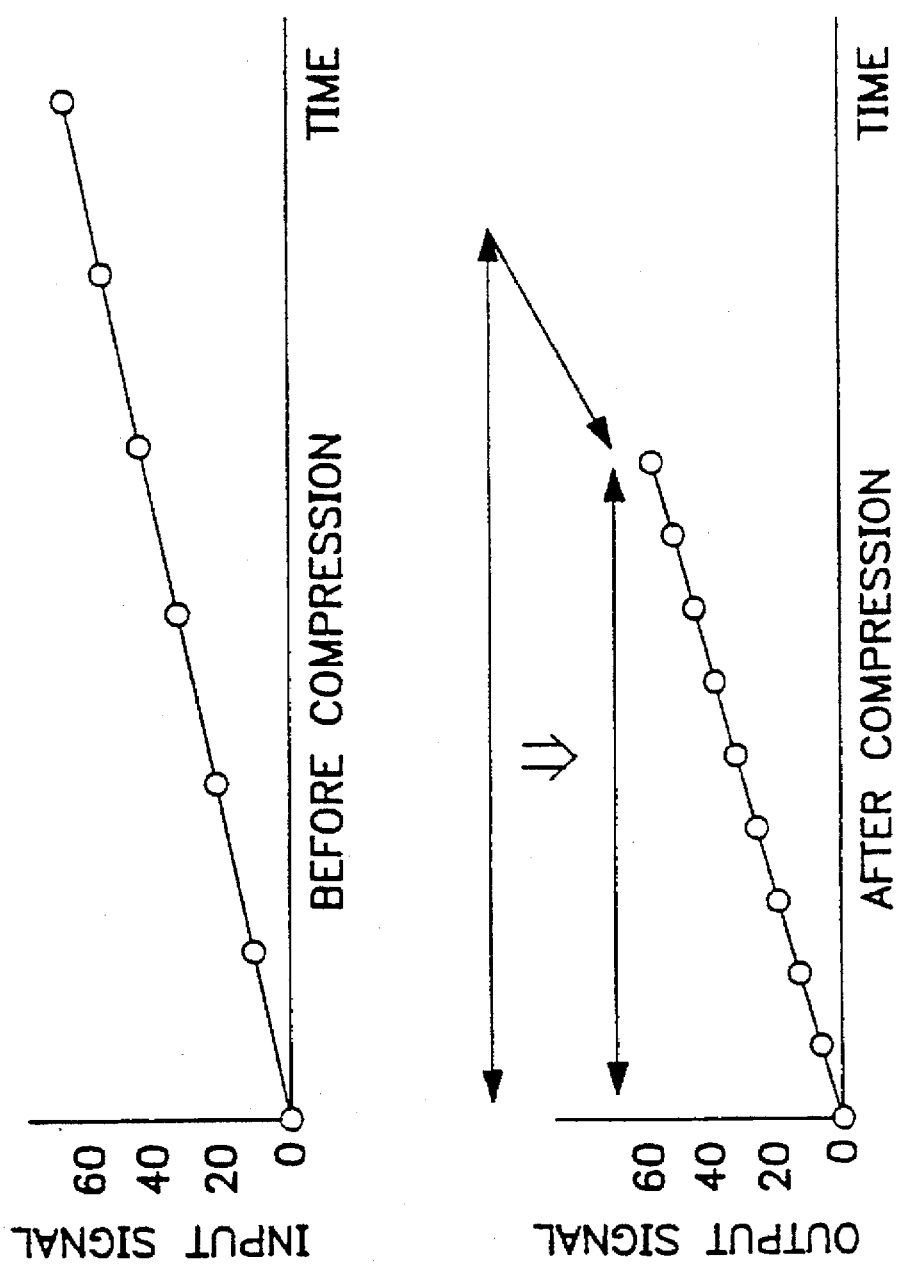

As shown in FIGS. 4(i) and (j), the input video signal is compressed into ¾ and the number of data increases to two times of the original. If unnecessary, they are thinned out.

Although a ¾ compression was explained above, any compression ratio can be realized by varying the number of cycles of the RE pulse and the interpolation coefficient.

According to the second exemplary embodiment of the present invention, because a FIFO memory 21 in which an address generation is unnecessary is used, the circuit scale can be made small.

(Third Exemplary Embodiment)

Figure 5:
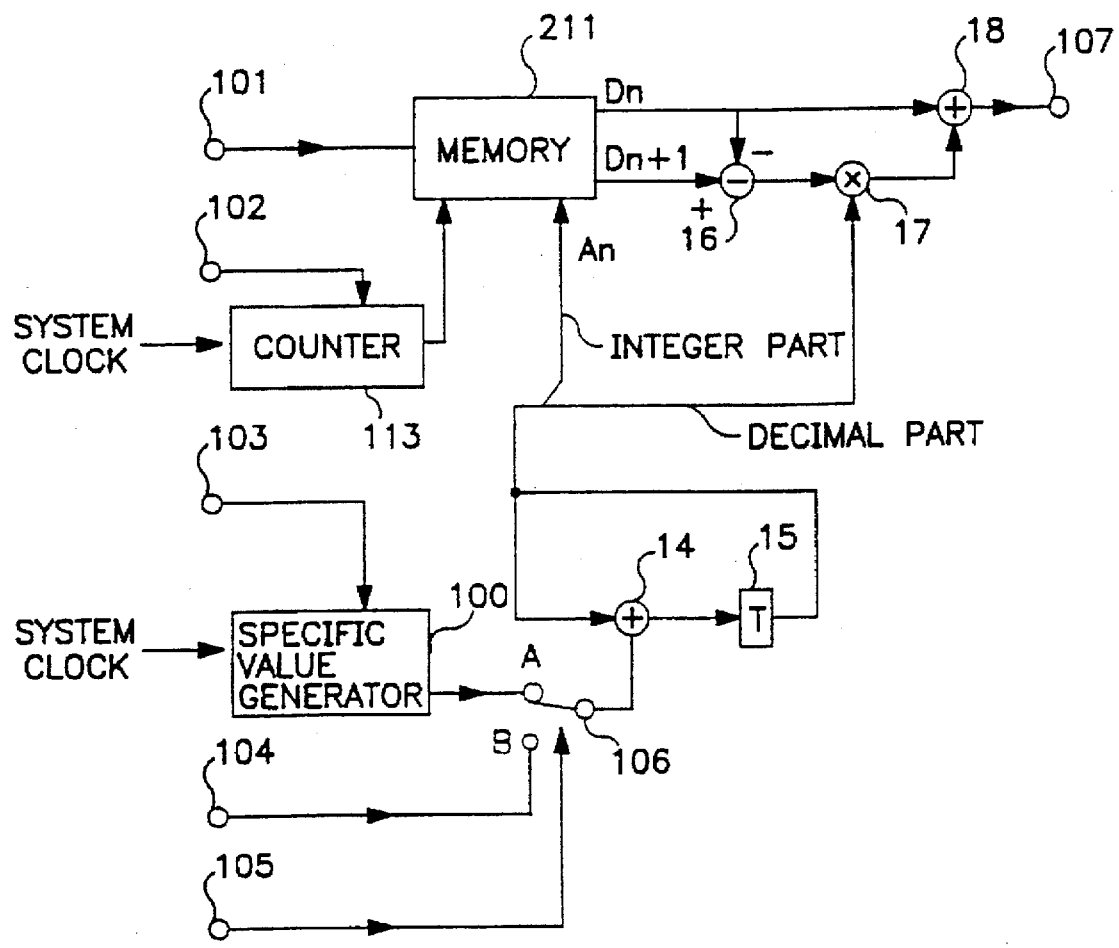
FIG. 5 is a block diagram of a video signal compression apparatus in accordance with a third exemplary embodiment of the present invention.

A block diagram of a video signal compression apparatus in accordance with a third exemplary embodiment of the present invention is shown in FIG. 5.

A counter 113 counts the number of clock pulses after being cleared by a horizontal sync signal 102 for writing and outputs a write address. A memory 211 stores an input video signal at the write address generated at the counter 113 and when a read address $A_n$ which is an integer part of the output of the register 15 is inputted to the memory 211, the memory 211 outputs data $D_n$ and $D_{n+1}$ for the address $A_n$ and $A_{n+1}$, respectively. A specific value generator 100 counts the number of clock pulses after being cleared by a horizontal sync signal 103 for reading and outputs a specific value previously written, individually corresponding to each counted data at every count. A signal selecting means 106 selects either the specific value generated at the specific value generator 100 or a fixed specific value 104 inputted from the outside according to a selection command 105.

An adder 14 adds the output of the register 15 and the output of the signal selecting means 106. The register 15 latches the output of the adder 14. The integer part of the output of the register 15 is used for a read address of the memory 211. A subtracter 16 calculates data $(D_{n+1}-D_n)$. A multiplier 17 multiplies the data $(D_{n+1}-D_n)$ by the integer part of the output of the register 15. An adder 18 adds the data $D_n$ and the output of the multiplier 17 and outputs the sum. The output of the adder 18 is a compressed video signal as explained below.

Pictures produced by a video signal compression apparatus in accordance with the third exemplary embodiment of the present invention are illustrated in FIGS. 6(a)–(d).

When the input video signal is desired to be outputted as it is, the signal selecting means 106 is set to select a terminal B and a fixed specific value R which the compression ratio is 1 is inputted from the outside to the terminal B. The picture in this case is illustrated in FIG. 6(a).

When the input video signal is desired to be horizontally compressed to ¾, the signal selecting means 106 is also set to select the terminal B and a fixed specific value S which the compression ratio is ¾ is inputted from the outside to the terminal B. The picture in this case is illustrated in FIG. 6(b).

When the compression ratio is desired to be varied at every clock pulse, the signal selecting means 106 is set to select the terminal A and a specific value T shown in FIG. 6(d) is inputted from the specific value generator 100 to the terminal A.

The picture in this case is illustrated in FIG. 6(c).

According to the third exemplary embodiment of the present invention, it is possible to select a mode in which the compression ratio is constant or another mode in which the compression ratio is varied at every system clock pulse. Further, in the mode in which the compression ratio is constant, an arbitrary compression ratio can be set from the outside.

(Fourth Exemplary Embodiment)

Figure 7:
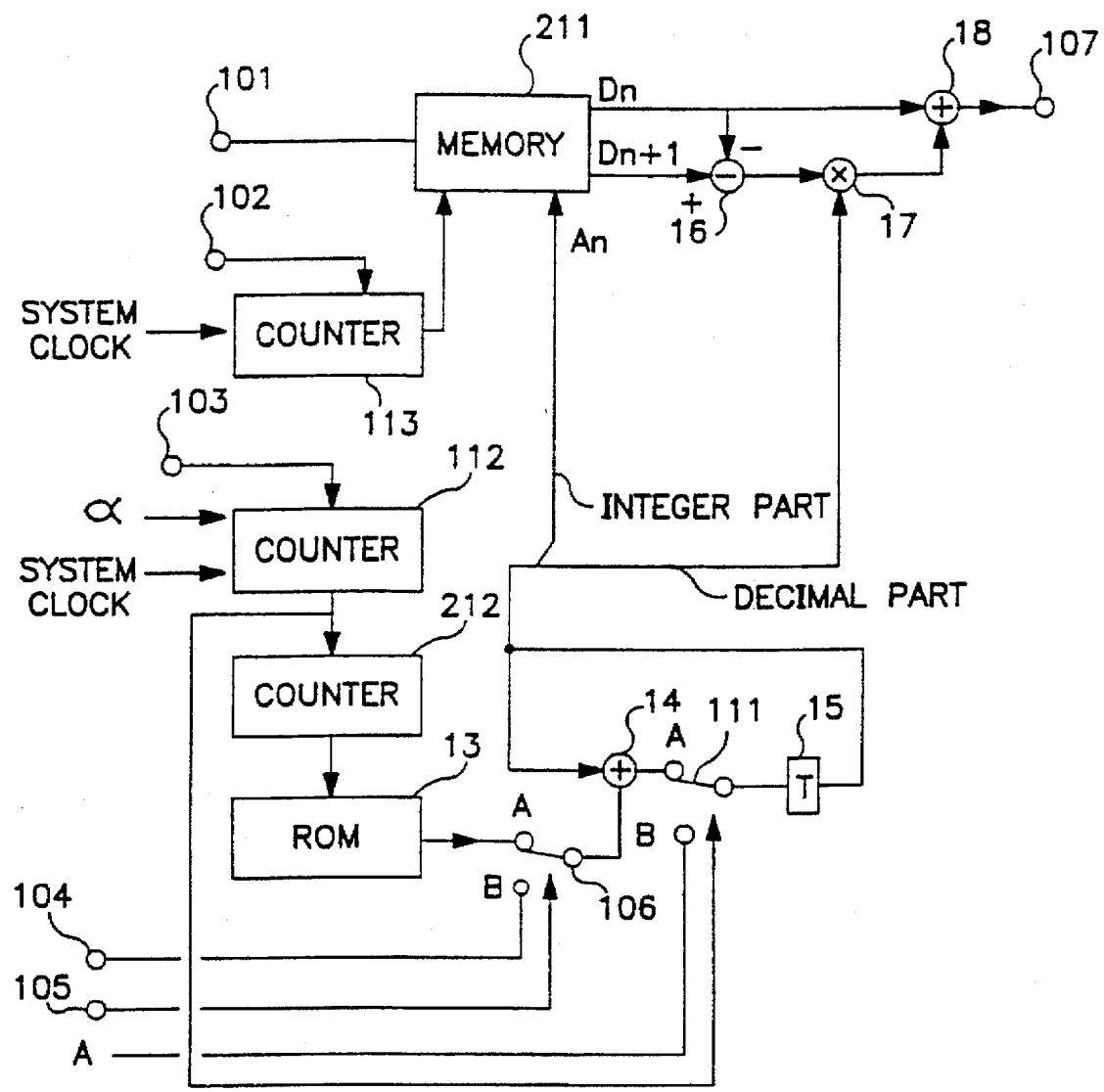
FIG. 7 is a block diagram of a video signal compression apparatus in accordance with a fourth exemplary embodiment of the present invention.

A block diagram of a video signal compression apparatus in accordance with a fourth exemplary embodiment of the present invention is shown in FIG. 7.

A counter 113 counts the number of clock pulses after being cleared by a horizontal sync signal 102 for writing data and outputs a write address. A memory 211 stores an input video signal in the write address generated at the counter 113 and when a read address $A_n$ which is an integer part of the output of the register 15 is inputted to the memory 211, the memory 211 outputs data $D_n$ and $D_{n+1}$ for the address $A_n$ and $A_{n+1}$, respectively. A counter 112 counts the number of clock pulses after being cleared by a horizontal sync signal 103 for reading data and when the counted data reaches to phase data Á designated from the outside, the counter 112 outputs a reset signal L to a counter 212 and a second signal selecting means 111. The counter 212 counts the number of clock pulses after being cleared by the reset signal L and outputs the counted data 0, 1, 2, 3 ... to a ROM 13. The ROM 13 outputs a specific value previously written, individually corresponding to each counted data of the counter 212 at every count. A first signal selecting means 106 selects either a specific value generated at the ROM 13 or a fixed specific value 104 inputted from the outside according to a selection command 105. An adder 14 adds an output of the register 15 and the output of the first signal selecting means 106. A second signal selecting means 111 usually selects an output of the adder 14 but only when the reset signal L is generated, the second signal selecting means 111 selects a read start addressing A inputted from the outside for a short time. The register 15 latches the output of the second signal selecting means 111. The integer part of the output of the register 15 is used for a read address of the memory 211. A subtracter 16 calculates data $(D_{n+1}-D_n)$. A multiplier 17 multiplies the data $(D_{n+1}-D_n)$ by the decimal part of the output of the register 15. An adder 18 adds the data $D_n$ and the output of the multiplier 17 and outputs the sum. The output of the adder 18 is a compressed video signal, as explained below.

The performance of a video signal compression apparatus in accordance with the first exemplary embodiment of the present invention is explained using a timing chart shown in FIGS. 8(a)–(f).

Figure 8:
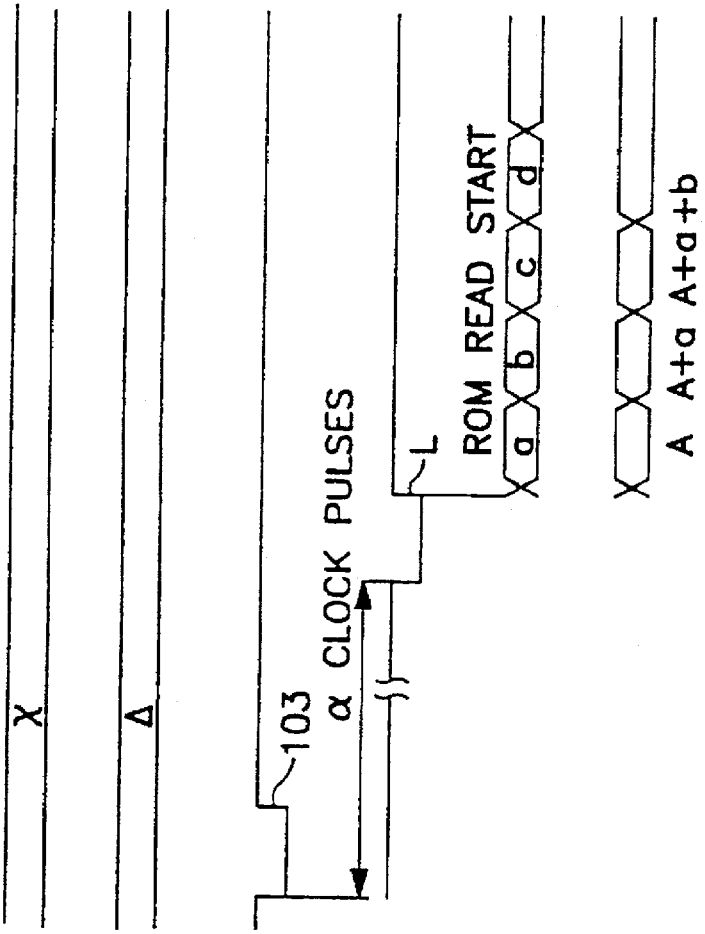
FIGS. 8(a)–(f) shows a timing chart of a video signal compression apparatus in accordance with the fourth exemplary embodiment of the present invention.
Figure 9:
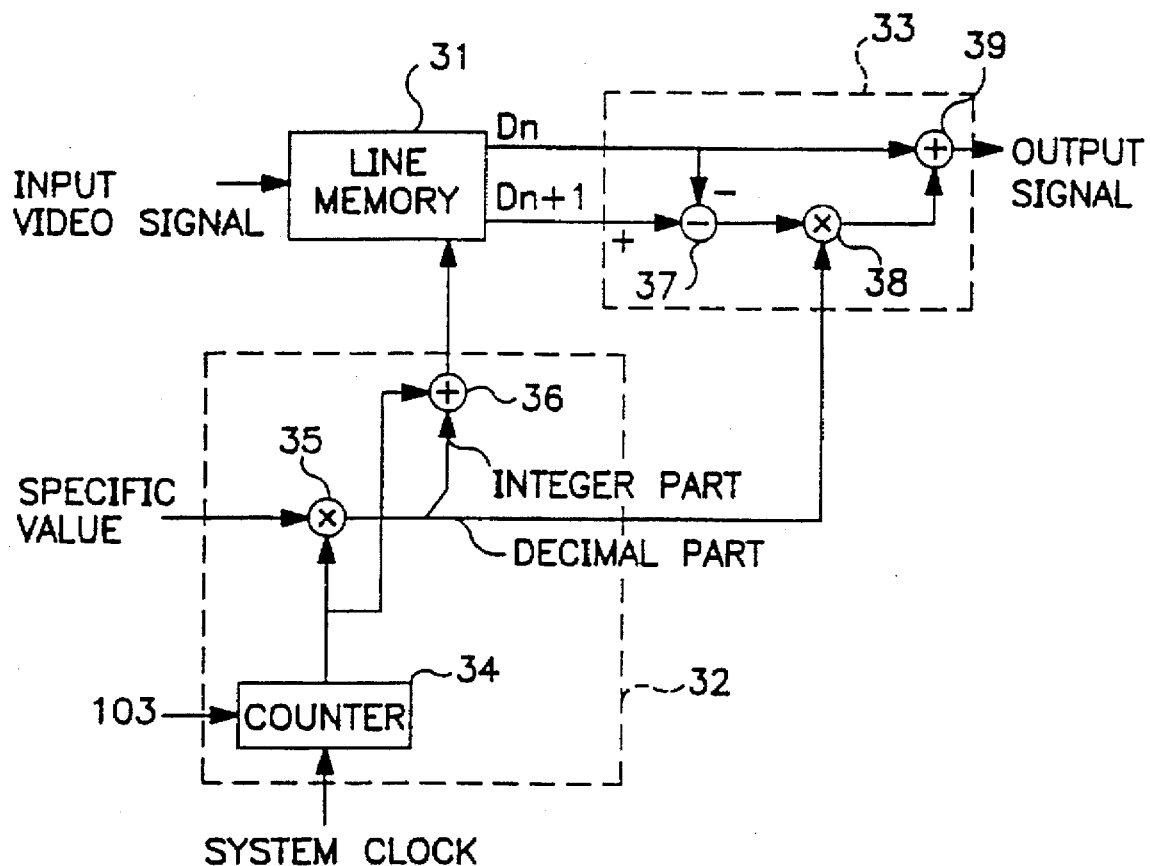
FIG. 9 is a block diagram of a video signal compression apparatus in accordance with the prior art.
Figures 10A, 10B:
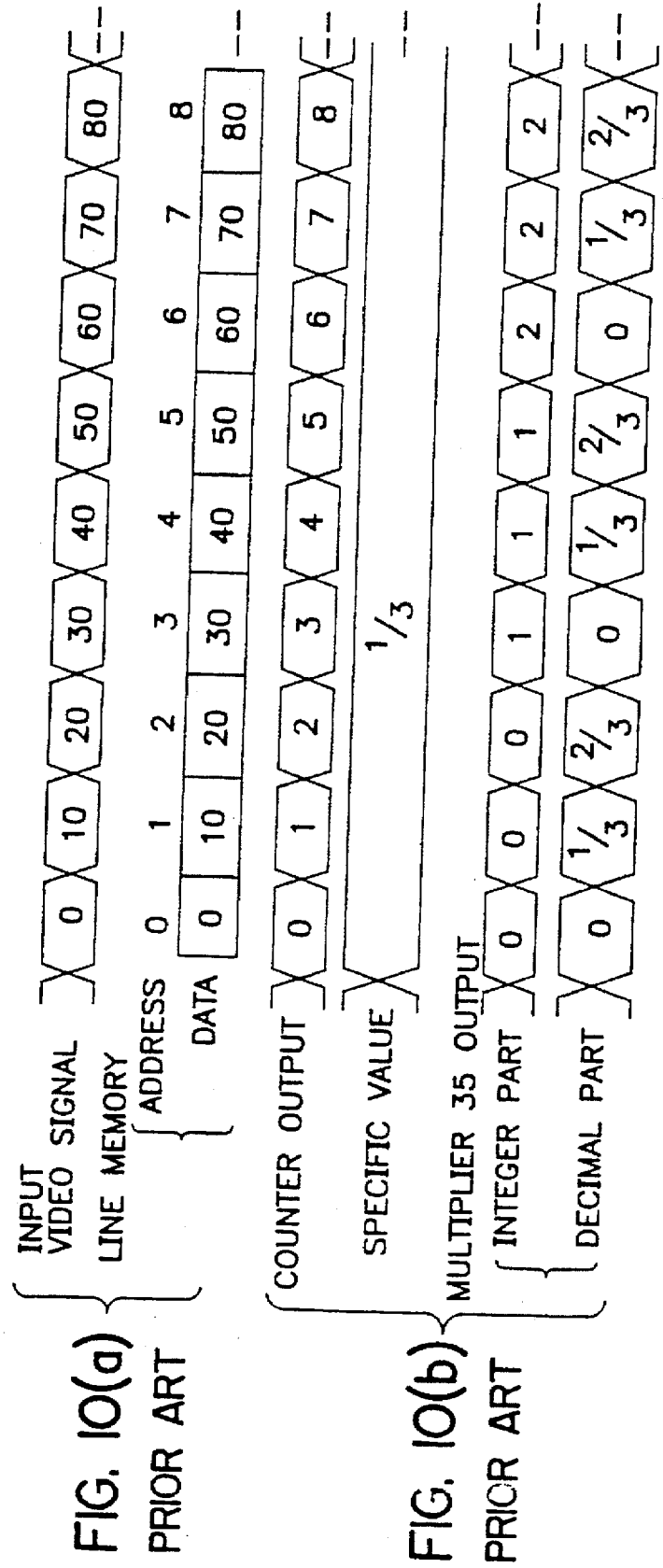
Figure 12A:
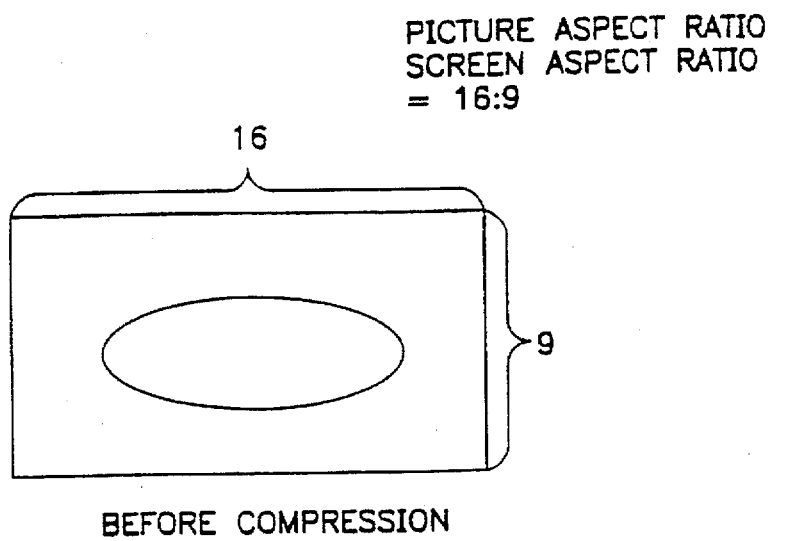
FIGS. 12(a)–(b) illustrates pictures before and after the video signal is compressed.
Figure 12B:
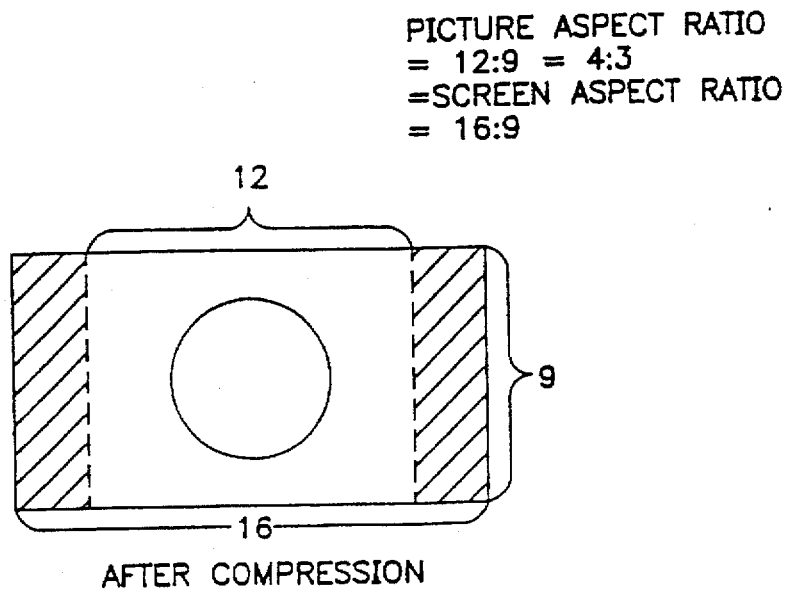

As shown in FIG. 8 (a), a phase data α is inputted to the counter 112 from the outside.

As shown in FIG. 8(b), a read start address A is inputted from the outside.

As shown in FIG. 8 (c), the counter 112 is cleared.

As shown in FIG. 8(d), the counter 112 outputs a reset signal L after a clock pulses. The counter 212 is cleared by the reset signal L.

The second signal selecting means 111 selects the read start addressing A for a short time only when the reset signal L is generated and outputs the read start addressing A to the register 15.

As shown in FIG. 8(e), the counter 212 counts the number of clock pulses after being cleared by the reset signal L and outputs the counted data 0, 1, 2, 3 ... to the ROM 13. The ROM 13 outputs the specific value a, b, c, d ... previously written, individually corresponding to each counted data.

As shown in FIG. 8(f), the register 15 outputs the address A, A+a, A+a+b ....

In the fourth exemplary embodiment of the present invention, the picture position and the compression position can be selected by the values a and A inputted from the outside.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A video signal compression apparatus for compressing a video signal comprising:

memory means for storing an input video signal and for outputting data value $D_n$ for address $A_n$ and data value $D_{n+1}$ for address $A_{n+1}$ when a read address $A_n$ is given;

first counter means for outputting a reset signal responsive to a horizontal sync signal for reading by a system clock pulses;

second counter means for counting said system clock pulses responsive to said reset signal from said first counter means to provide a counter output value;

further memory means for outputting one of a plurality of previously stored values corresponding to said counter output value;

first signal selector means for selecting one of the output of said further memory means and a fixed value to generate a first selector output value;

first adder means for adding the first selector output value and the register value to generate a first adder output value;

second signal selector means for selecting a read start address command responsive to said reset signal and for otherwise selecting said first adder output value to generate a second selector output value;

register means for latching said second selector output value to generate a register output value, wherein an integer part of the register output value is said read address $A_n$ of said memory means;

subtracter means for subtracting data $D_n$ from data $D_{n+1}$ and generating a subtraction value;

multiplier means for multiplying said subtraction value by a decimal part of said register output value to generate a multiplier output value; and second adder means for adding the data $D_n$ and the multiplier output value and for outputting said compressed video signal.

* * * * *

UNITED STATES PATENT AND TRADE MARK OFFICE
CERTIFICATE OF CORRECTION

PATENT NO.   : 5,715,010
DATED        : February 3, 1998
INVENTOR(S)  : Izawa et al.

It is certified that error appears in the above-identified patent and that said Letters Patent is hereby corrected as shown below:

In Column 6, line 53, delete "a"

Signed and Sealed this

Ninth Day of March, 1999

Attest:

Attesting Officer

Q. TODD DICKINSON

Acting Commissioner of Patents and Trademarks